US00RE34258E

United States Patent [19]

Haytayan

[11] E Patent Number: Re. 34,258

[45] Reissued Date of Patent: May 25, 1993

[54] DISK FOR CARRYING PROPELLANT CHARGES

[76] Inventor: Harry M. Haytayan, 32 Indian Rock Rd., Nashua, N.H. 03063

[21] Appl. No.: 868,200

[22] Filed: Apr. 14, 1992

Related U.S. Patent Documents

Reissue of:

[64] Patent No.: 5,075,997
Issued: Dec. 31, 1991
Appl. No.: 604,865
Filed: Oct. 29, 1990

[51] Int. Cl.[5] ..... F41A 9/85
[52] U.S. Cl. ..... 42/89
[58] Field of Search ..... 42/49.01, 89; 89/34, 89/35.01; 102/281, 530, 531; 227/9, 10, 11

[56] References Cited

U.S. PATENT DOCUMENTS

| | | | |
|---|---|---|---|
| 3,523,383 | 8/1970 | Sposimo | 42/89 |
| 3,611,870 | 10/1971 | Udert et al. | 89/35.01 |
| 4,036,103 | 7/1977 | Gawlick et al. | 89/35.01 |
| 4,098,169 | 7/1978 | Gawlick et al. | 89/35.01 |
| 4,375,269 | 3/1983 | Bosch et al. | 227/10 |
| 4,560,061 | 12/1985 | Haytayan | 89/35.01 |
| 4,565,114 | 1/1986 | Burdick et al. | 89/35.01 |
| 4,610,382 | 9/1986 | Ollivier et al. | 42/89 |

*Primary Examiner*—Michael J. Carone
*Attorney, Agent, or Firm*—Pandiscio & Pandiscio

[57] ABSTRACT

A magazine for accommodating propellant charges in the form of a thin metal disk. The disk is of circular form and is provided with a plurality of spaced orifices located adjacent the periphery of the disk for retaining the propellant charges. A reinforcement is provided on the disk to prevent the creation of disruptive vibrations that might cause sympathetic firing of charges. The reinforcement is in the form of an undulation which in one form creates an annular groove on one side of the disk and a circular rib on the other side of the disk; and in another form comprises a series of radially extending ribs of like configuration.

20 Claims, 2 Drawing Sheets

DISK FOR CARRYING PROPELLANT CHARGES

Matter enclosed in heavy brackets [ ] appears in the original patent but forms no part of this reissue specification; matter printed in italics indicates the additions made by reissue.

FIELD OF THE INVENTION

This invention relates to a disk for carrying propellant charges, and is more particularly concerned with disk-type loads for powder actuated tools.

BACKGROUND OF THE INVENTION

Magazines for accommodating propellant charges or cartridges are well known. Such magazines have been used in combination with bolts, nails, projectiles, etc. for commercial uses as well as for weaponry.

Magazines in the form of coilable flat metal strips which have a plurality of holes for accommodating cartridges are well known as shown in U.S. Pat. No. 4,036,103, issued to Gawlick, et al on Jul. 19, 1977. In that patent there is shown a strip which is deformed in the area of the holes to form cartridge holding collars which have spring-back resilience. Another form of coilable flexible metal strip magazine is shown in U.S. Pat. No. 4,098,169, issued to Gawlick, et al on Jul. 4, 1978. In that patent the strip is provided with a clamping means associated with each hole for positively clamping the cartridge to the strip. The clamping means includes a tubular casing for each hole which is press-fit to the cartridge and is connected to the strip. Tools employing magazines of this type are unwieldy in that the ammunition strip trails from the tool both at the inlet to the firing chamber and at the outlet from it. As a result they are awkward to use in locations of limited space.

Powder-actuated tools are known which employ disk-type magazines which carry a number of cartridges or propellant charges projecting from a planar carrier, which is moved into firing position by rotation of the disk. Such a device is shown for example in U.S. Pat. No. 4,375,269, issued to Bosch et al on Mar. 1, 1983.

Disk-type magazines must of necessity mount the cartridges or charges relatively close to one another in order for a reasonable number of firings to be permitted with one loading. It has been observed that occasionally when one of the charges is fired one or both of the charges adjacent thereto may also be fired by the uncontrolled propagation of the explosive forces through the disk to such adjacent charge. This problem has been recognized in U.S. Pat. No. 4,610,382, issued to Ollivier et al on Sep. 9, 1986. In that patent there is shown a rotatable loader disk provided with a central orifice and a series of orifices for receiving propellant charges. The problem noted above is proposed to be solved by providing a series of holes arranged radially between the central orifice and the cartridge orifices. These additional holes are proposed to provide a means to form an obstacle to the propagation of mechanical stress related to the firing of one propellant charge. However, the placement of such additional series of holes adds additional cost and time to the manufacture of the magazine and reduces its rigidity.

SUMMARY OF THE INVENTION

It is therefore one object of the invention to eliminate any possibility of misfiring, or unwanted firing, of additional propellant charges in addition to the one intended to be fired.

It is a further object of the invention to provide means to reinforce a disk-type magazine so that it does not experience the propagation of mechanical stress or vibrations to cause sympathetic firing of cartridges or charges carried on the disk.

The present invention teaches the strengthening of the disk-type magazine by providing a reinforcing means centrally or radially thereof which serves as a dampening means, whereby the creation of any disruptive vibrations or stresses upon the firing of a propulsive charge is substantially prevented. Consequently it is not necessary in a magazine constructed in accordance with the teaching of the invention to inhibit the propagation of stress to the cartridge holding orifices, since such degree of stress is not present. The use of stress relief means in the form of a series of orifices intermediate a central opening and the charge holding orifices, as proposed in the prior art, for preventing propagation of mechanical stress still permits the transmission of stress to the adjacent charges and at the same time structurally weakens the disk. In the present invention no material is removed from the disk and propagation waves of mechanical stress are essentially eliminated because of the dampening nature of the reinforcement means.

BRIEF DESCRIPTION OF THE DRAWINGS

The foregoing and other objects of the invention will become more readily apparent upon a reading of the detailed description following hereinafter, and upon reference to the accompanying drawings, in which.

DETAILED DESCRIPTION OF THE INVENTION

Figure 1:
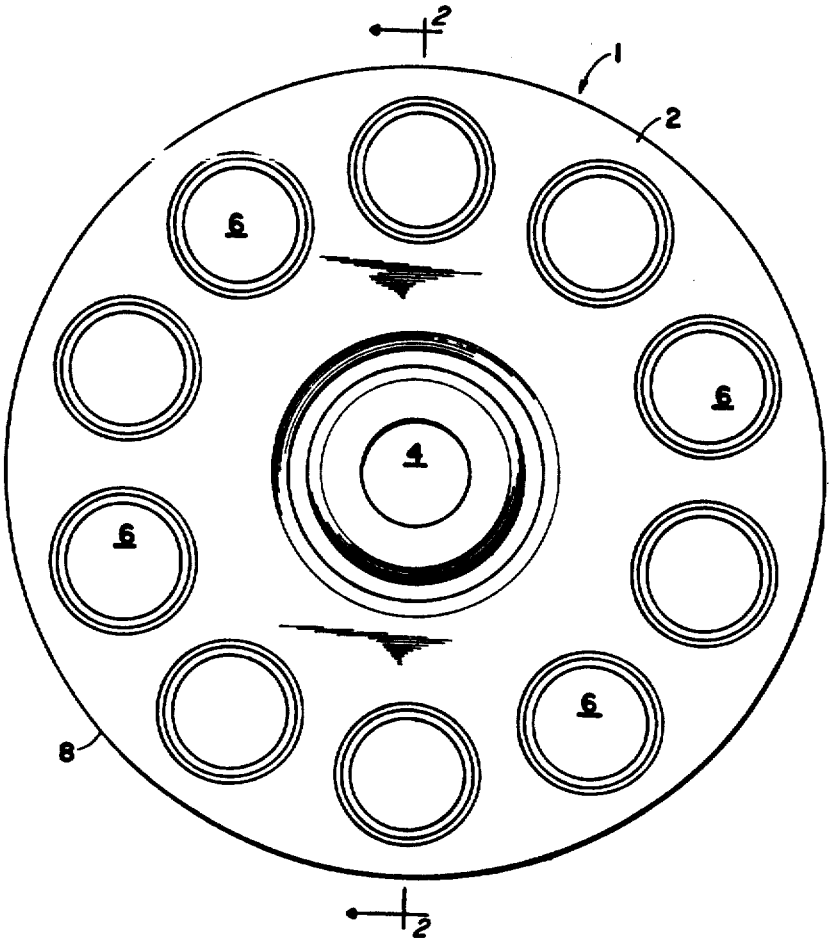
FIG. 1 is a plan view of a preferred embodiment of the disk magazine of the invention.
Figure 2:
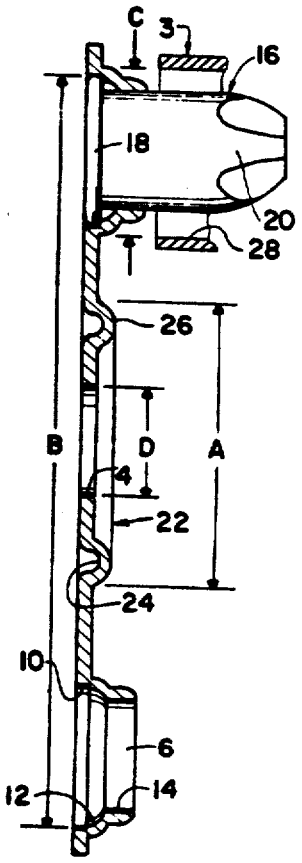
FIG. 2 is a cross-sectional view taken along line 2—2 of FIG. 1, with only one propellant charge being shown, for purposes of clarity.

As shown in FIGS. 1 and 2, the magazine or loader 1 is in the form of a relatively thin annular disk 2 which is preferably formed of sheet metal, e.g. steel, aluminum, etc. Although not shown, it is to be understood that the disk is intended to be used for example in a fastener driving tool wherein the propellant charge is rim-fired to drive a piston within a barrel/cylinder 3, and the piston in turn drives a fastener previously positioned in the barrel/cylinder to penetrate material to be fastened.

The disk 2 is provided with a central opening 4. A series of charge holding orifices 6 are provided which are annularly arranged towards the periphery 8 of disk 2. The walls of each orifice 6 are formed in a stepped fashion as shown in FIG. 2. Thus there is a large diameter wall section 10, an intermediate wall section 12 and a small wall section 14, all adapted to follow the form of the charges such as the jacketed propellant charge 16, which has a head 18 to nest in section 10. The section 14 is of a dimension which has a press-fit with the central cylindrical section 20 of the charge 16.

Located between the central orifice 4 (see FIG. 2) and the annularly arranged orifices 6 is an undulated section or corrugation 22 which can be formed by compression or embossing in a press. The shape of the section 22 is such that an annular groove 24 is formed on one side of the disk, while a corresponding circular rib 26 is formed on the other side of the disk. This construction strengthens the disk so that upon the firing of any one charge essentially no forces are allowed to traverse the disk. The undulated section 22 thus provides a dampening action to absorb the forces that are created upon the firing of a charge.

It has been determined that in order to obtain optimum desired results certain dimensional relationships should be maintained. The outside diameter A of the corrugation 22 should be maintained concentric with the diameter D of the central opening 4 within a limit of 0.005"-0.010" in order to assure precise locating of the magazine 1 within a tool to prevent detonation of live loads during insertion. Similarly, the relationship of the diameter B to D should have the same concentricity of being within the limit of 0.005"-0.101". A further relationship that is critical is the diameter C which forms a seal with the inner diameter 28 of the tool barrel/cylinder 3. The internal diameter 28 should be no more than about 0.005" greater than the diameter C. The latter relationship will prevent gases from the load escaping during detonation which would cause backfire.

Figure 3:
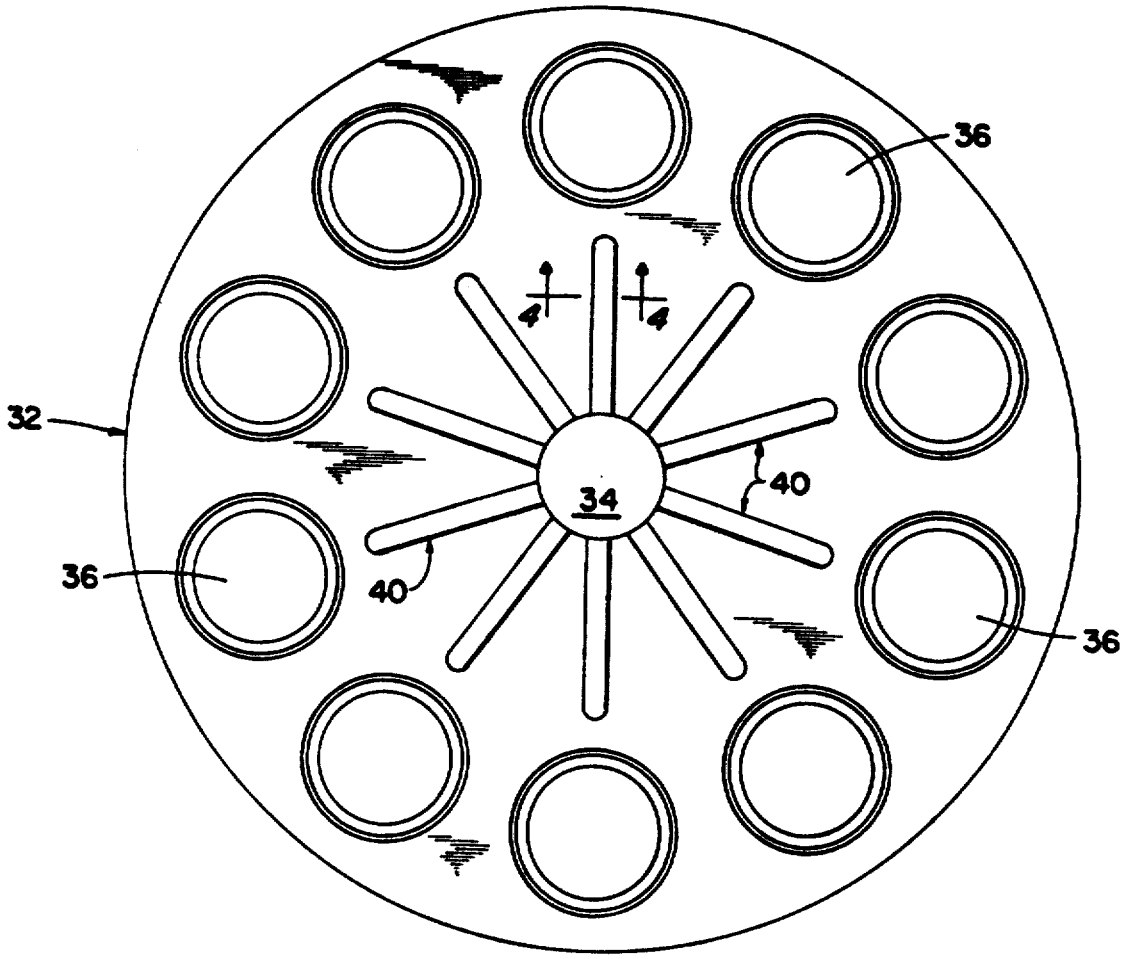
FIG. 3 is a plan view of a further embodiment of the disk magazine of the invention.
Figure 4:
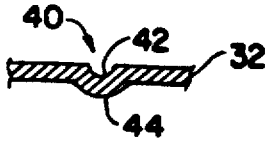
FIG. 4 is a cross-sectional view taken along line 4—4 of FIG. 3.

In an alternate form of the invention, and as shown in FIGS. 3 and 4, the magazine 30 is in the form of a disk 32 which is provided with the central opening 34 and the series of charge holding orifices 36. The orifices 36 are annularly arranged towards the periphery 38 of the disk 30. The foregoing structure is similar to that shown in the first described embodiment. However, instead of the undulated section or corrugation 22 of the embodiment of FIGS. 1-2, there is employed a series of radially extending ribs 40 emanating from the central opening 34. As shown in FIG. 4 each rib 40 is formed by compression or embossing in a press to assume the shape such that a groove 42 appears on one side of the disk 32 and a raised portion 44 appears on the other side of the disk. This construction also serves to strengthen the disk so that upon the firing of any one charge essentially no forces are allowed to traverse the disk. The series of ribs provide the dampening action to absorb the forces that are created upon the firing of a charge.

The invention is not intended to be limited to use in the tool described since it can be used in various tools and devices other than fasteners.

What is claimed is:

1. A magazine for accommodating propellant charges comprising:

a thin metal disk having a circular outer periphery, said disk being provided with a plurality of spaced orifices located in an annular array adjacent its outer periphery for retaining jacketed propellant charges; and reinforcing means located on said disk providing dampening capability to substantially prevent the transmission of disruptive vibrations that otherwise would traverse the disk upon the firing of a propulsive charge and cause sympathetic firing of other adjacent propulsive charges.

2. A magazine for accommodating propellant charges according to claim 1, wherein said reinforcing means comprises an undulated section formed in said disk.

3. A magazine for accommodating propellant charges according to claim 2, wherein said undulated section is located between the center and the outer periphery of the disk.

4. A magazine for accommodating propellant charges according to claim 2, wherein said undulated section is located between said annularly arranged orifices and the center [o] *of* said disk.

5. A magazine for accommodating propellant charges according to any of claims 2, 3 or 4, wherein said undulated section includes an annular groove formed on one side of said disk and a corresponding circular rib formed on the other side of the disk.

6. A magazine for accommodating propellant charges comprising:

a thin metal disk having a circular outer periphery, said disk being provided with a plurality of spaced orifices located in an annular array adjacent its outer periphery for retaining jacketed propellant charges; each of said orifices being formed in a configuration of a plurality of wall sections of successively decreasing dimension, the largest dimension section opening onto one surface of said disk; and reinforcing means located on said disk providing dampening capability to substantially prevent the creation of disruptive vibrations that would otherwise traverse the disk upon the firing of a propulsive charge and cause sympathetic firing of other adjacent propulsive charges.

7. A magazine for accommodating propellant charges according to claim 6, wherein said reinforcing means comprises an undulated section formed in said disk.

8. A magazine for accommodating propellant charges according to claim 7, wherein said undulated section is located between the center and the outer periphery of the disk.

9. A magazine for accommodating propellant charges according to claim 7, wherein said undulated section is located between said annularly arranged orifices and the center of said disk.

10. A magazine for accommodating propellant charges according to any of claims 7, 8 or 9, wherein said undulated section includes an annular groove formed on one side of said disk and a corresponding circular rib formed on the other side of the disk.

11. A magazine for accommodating propellant charges according to any of claims 7, 8 or 9, wherein said undulated section includes a radially extending groove formed on one side of said disk and a corresponding radially extending rib formed on the other side of the disk.

12. A magazine for accommodating propellant charges according to claim 11, wherein said undulated section comprises a series of ribs extending radially from the center of the disk.

13. A magazine for accommodating propellant charges according to claim 10, wherein the groove is located on that surface of the disk onto which the largest dimension section of each of said orifices *opens*.

14. A magazine for accommodating propellant charges according to claim 11, wherein the groove is located on that surface of the disk onto which the largest diameter section of each of said orifices *opens*.

15. A magazine according to claim 6 further including a plurality of jacketed charges each positioned within one of said spaced orifices.

16. A magazine according to claim 15 wherein said jacketed charges have enlarged head sections that nest in the largest dimension sections of said orifices.

17. A magazine according to claim 16 wherein said reinforcing means comprises an annular undulation formed in said disk.

18. A magazine for accommodating propellant charges comprising:

a thin metal disk having a circular outer periphery and a central opening of a selected diameter, said disk being provided with a plurality of spaced orifices located in an annular array adjacent its outer periphery for retaining jacketed propellant charges; each of said orifices being formed in a configuration of a plurality of wall sections of successively decreasing dimension, the largest dimension section opening onto one surface of said disk; and reinforcing means located on said disk providing dampening capability to substantially prevent the creation of disruptive vibrations that would otherwise traverse the disk upon the firing of a propulsive charge and cause sympathetic firing of other adjacent propulsive charges, said reinforcing means comprising an undulated section formed in said disk, which includes an annular groove formed on one side of said disk and a corresponding circular rib having an outside diameter formed on the other side of the disk; and wherein the outside diameter of said rib is concentric with the diameter of the central opening within a limit of 0.005" to 0.010".

19. A magazine for accommodating propellant charges comprising:

a thin metal disk having a circular outer periphery and a central opening of a selected diameter, said disk being provided with a plurality of spaced orifices located in an annular array adjacent its outer periphery for retaining jacketed propellant charges; each of said orifices being formed in a configuration of a plurality of wall sections of successively decreasing dimension, the largest dimension section opening onto one surface of said disk; and reinforcing means located on said disk providing dampening capability to substantially prevent the creation of disruptive vibrations that would otherwise traverse the disk upon the firing of a propulsive charge and cause sympathetic firing of other adjacent propulsive charges, said reinforcing means comprising an undulated section formed in said disk, which includes an annular groove formed on one side of said disk and a corresponding circular rib formed on the other side of the disk, and wherein the diameter of a circle encompassing the outside surface of the smallest wall section of each of said orifices is concentric with the diameter of the central opening within a limit of 0.005" to 0.010".

20. A magazine for accommodating propellant charges for use with a tool having a barrel in the form of a cylinder, said propellant charges comprising:

a thin metal disk having a circular outer periphery, said disk being provided with a plurality of spaced orifices located in an annular array adjacent its outer periphery for retaining jacketed propellant charges; each of said orifices being formed in a configuration of a plurality of wall sections of successively decreasing dimension, the largest dimension section opening onto one surface of said disk; and reinforcing means located on said disk providing dampening capability to substantially prevent the creation of disruptive vibrations that would otherwise traverse the disk upon the firing of a propulsive charge and cause sympathetic firing of other adjacent propulsive charges, said reinforcing means comprising an undulated section formed in said disk, which includes an annular groove formed on one side of said disk and a corresponding circular rib formed on the other side of the disk, and wherein the internal diameter of the tool barrel/cylinder is larger than the diameter of the outside surface of the largest wall section of each of said orifices by an amount which is no greater than about 0.005".

* * * * *

UNITED STATES PATENT AND TRADEMARK OFFICE

CERTIFICATE OF CORRECTION

PATENT NO. : Re. 34,258

DATED : May 25, 1993

INVENTOR(S) : Harry M. Haytayan

It is certified that error appears in the above-indentified patent and that said Letters Patent is hereby corrected as shown below:

Claim 14, column 4, line 62, the word "diameter" should be -- dimension --.

Signed and Sealed this

Twenty-fourth Day of May, 1994

Bruce Lehman

*Attest:*

BRUCE LEHMAN

*Attesting Officer*

*Commissioner of Patents and Trademarks*